C. L. WORK.
Belt-Tighteners.

No. 149,423.  Patented April 7, 1874.

WITNESSES:

INVENTOR:

BY

ATTORNEYS.

UNITED STATES PATENT OFFICE.

CHARLES L. WORK, OF CINCINNATI, OHIO.

IMPROVEMENT IN BELT-TIGHTENERS.

Specification forming part of Letters Patent No. 149,423, dated April 7, 1874; application filed January 10, 1874.

*To all whom it may concern:*

Figure 1:
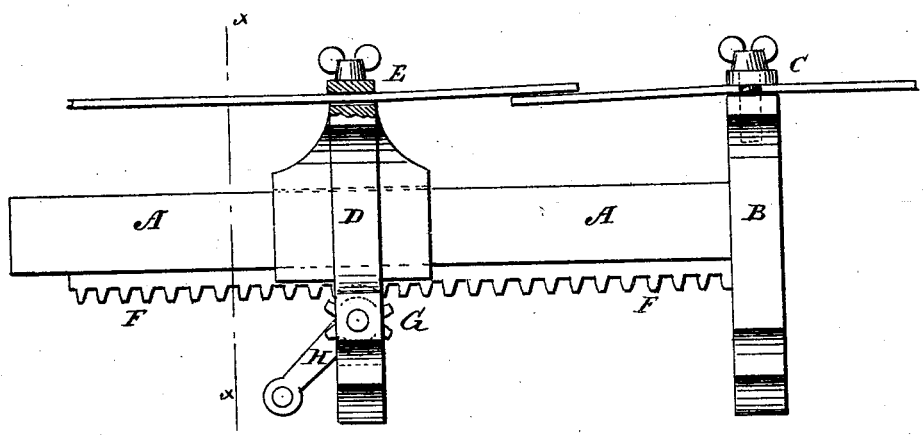
Figure 2:
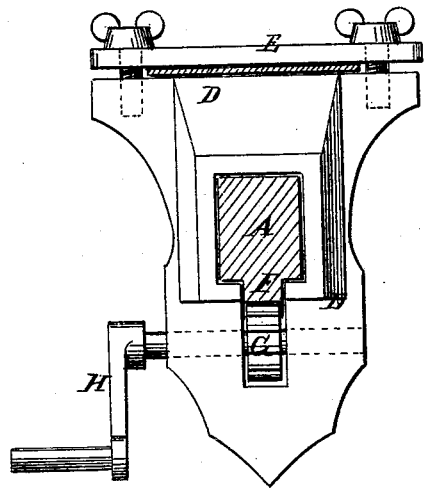

Be it known that I, CHARLES L. WORK, of Cincinnati, in the county of Hamilton and State of Ohio, have invented a new and useful Improvement in Belt-Tightener, of which the following is a specification:

Figure 1 is a side view of my improved belt-tightener, part being broken away to show the construction; and Fig. 2 is an end view of the same, partly in section, through the line $x\ x$, Fig. 1.

My invention has for its object to furnish a simple and convenient device for tightening belts easily and quickly, and without removing them from the pulleys. The invention relates to means for drawing together and holding a belt which is to be cut, and will first be fully described, and then pointed out in the claim.

A is a bar, to one end of which is attached a block, B, the upper edge of which is made flat, and upon it is placed a bar, C, which is secured in place by two hand-screws passing through the ends of said bar and screwing into the said block. Upon the bar A is placed a sliding block, D, which is so formed as to give it sufficient bearing upon the bar A to cause it to move squarely and without binding. Upon the upper edge of the block D is placed a bar, E, similar to the bar C, and secured in the same way by two hand-screws. Upon the lower side of the bar A is formed, or to it is attached, a rack, F, into the teeth of which mesh the teeth of a small pinion, G, pivoted in a recess in the sliding block D, and to one of the journals of which is attached a crank, H, so that, by operating the said crank, the block D may be moved back and forth along the bar A.

If desired, the rack and pinion F G may be replaced by an equivalent swiveled screw and nut for moving the block D along the bar A, which swiveled screw may be placed beneath the bar A; or said bar may be made hollow and the said screw placed within it.

In using the tightener, the sliding block D is run back, and the belt is clamped to the blocks B D by the bars C E and their hand-screws. The sliding block D is then run forward until the belt is sufficiently taut. The belt can then be conveniently cut and laced or otherwise secured, and the device detached, thus tightening the belt conveniently and quickly, and without removing it from its pulleys.

Having thus described my invention, I claim as new and desire to secure by Letters Patent—

The combination, with rack-bar A and pinion G, of the stationary block B and movable one D, each provided with an adjustable clamping-plate, as and for the purpose described.

CHARLES L. WORK.

Witnesses:
L. O. BINCKLEY,
GEORGE STUART.